(12) United States Patent
Yamaga

(10) Patent No.: US 11,693,097 B2
(45) Date of Patent: Jul. 4, 2023

(54) OPTICAL SCANNING DEVICE, OPTICAL MEASURING APPARATUS, AND ROBOT

(71) Applicant: SEIKO EPSON CORPORATION, Tokyo (JP)

(72) Inventor: Hirokazu Yamaga, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 258 days.

(21) Appl. No.: 17/005,340

(22) Filed: Aug. 28, 2020

(65) Prior Publication Data

US 2021/0063543 A1    Mar. 4, 2021

(30) Foreign Application Priority Data

Aug. 29, 2019  (JP) ................................ 2019-156282

(51) Int. Cl.
| | | |
|---|---|---|
| *B25J 13/08* | (2006.01) | |
| *B25J 9/16* | (2006.01) | |
| *G01S 7/48* | (2006.01) | |
| *G01S 7/481* | (2006.01) | |

(52) U.S. Cl.
CPC ........... *G01S 7/4817* (2013.01); *B25J 9/1697* (2013.01); *B25J 13/08* (2013.01)

(58) Field of Classification Search
CPC .... G01S 7/4817; G01S 7/4814; G01S 7/4816; G01S 17/42; G01S 17/89; B25J 9/1697; B25J 13/08; B25J 19/021; B25J 9/00; B25J 9/1602; G02B 26/105; G01B 11/2513; G01B 11/2527; G01B 11/254
See application file for complete search history.

(56) References Cited

U.S. PATENT DOCUMENTS

| | | | | |
|---|---|---|---|---|
| 8,363,296 B2* | 1/2013 | Andoh | ................... | G02B 7/182 |
| | | | | 347/232 |
| 2007/0146851 A1* | 6/2007 | Nakajima | ............ | G02B 26/105 |
| | | | | 359/213.1 |
| 2008/0218829 A1 | 9/2008 | Nakamura | | |
| 2009/0290163 A1* | 11/2009 | Dubois | .............. | G01B 9/02049 |
| | | | | 901/14 |

(Continued)

FOREIGN PATENT DOCUMENTS

| | | | |
|---|---|---|---|
| CN | 101295073 A | 10/2008 | |
| CN | 101680947 A | 3/2010 | |

(Continued)

OTHER PUBLICATIONS

Search Report of the First Office Action CN Application No. 2020108784563 dated Feb. 21, 2022.

*Primary Examiner* — Kira Nguyen
(74) *Attorney, Agent, or Firm* — Gang Yu

(57) ABSTRACT

An optical scanning device includes a light source unit having a light exiting portion from which a light is output, a scanning unit having a mirror supported by a supporting part and reflecting the light output from the light exiting portion while swinging the mirror around a swing axis, and a housing having an enclosed space partitioned by a plurality of wall portions including a first wall portion and a second wall portion, in which the light exiting portion and the scanning unit are placed in the enclosed space, wherein the first wall portion transmits the light reflected by the scanning unit, and the second wall portion includes a part of the light source unit.

8 Claims, 8 Drawing Sheets

(56) References Cited

U.S. PATENT DOCUMENTS

| | | | |
|---|---|---|---|
| 2010/0118363 A1 | 5/2010 | Shigematsu et al. | |
| 2013/0107032 A1* | 5/2013 | Yamada | G01B 11/25 |
| | | | 348/86 |
| 2014/0333906 A1 | 11/2014 | Hirono et al. | |
| 2015/0029490 A1 | 1/2015 | Horibe et al. | |
| 2016/0245919 A1* | 8/2016 | Kalscheur | G01S 7/4817 |
| 2018/0128903 A1* | 5/2018 | Chang | G01S 7/4816 |
| 2018/0267282 A1* | 9/2018 | Kaufman | G01J 3/0208 |

FOREIGN PATENT DOCUMENTS

| | | |
|---|---|---|
| JP | S54068850 A | 5/1979 |
| JP | 2008305758 A | 12/2008 |
| JP | 2014219565 A | 11/2014 |
| JP | 2015025901 A | 2/2015 |
| JP | 2017111285 A | 6/2017 |
| JP | 2018146521 A | 9/2018 |
| JP | 2019053331 A | 4/2019 |

\* cited by examiner

OPTICAL SCANNING DEVICE, OPTICAL MEASURING APPARATUS, AND ROBOT

The present application is based on, and claims priority from JP Application Serial Number 2019-156282, filed Aug. 29, 2019, the disclosure of which is hereby incorporated by reference herein in its entirety.

BACKGROUND

1. Technical Field

The present disclosure relates to an optical scanning device, an optical measuring apparatus, and a robot.

2. Related Art

Regarding optical scanning devices, for example, JP-A-2019-53331 discloses a device that scans a scanned surface by reflecting a laser beam with a swingable mirror. In the device disclosed in JP-A-2019-53331, a package and a cover glass cover around the mirror and the cover glass is placed between a laser beam source and the mirror. Thereby, the cover glass transmits the laser beam and prevents dust on the mirror.

However, in the device disclosed in JP-A-2019-53331, the cover glass is placed between the laser beam source and the mirror, and thus, it is harder to place the beam source and the mirror close to each other and downsizing of the device is difficult. The problem is not only for the optical scanning devices, but common among optical measuring apparatuses including the optical scanning devices, robots, etc.

SUMMARY

According to an aspect of the present disclosure, an optical scanning device is disclosed. The optical scanning device includes a light source unit having a light exiting portion from which a light is output, a scanning unit having a mirror supported by a supporting part and reflecting the light output from the light exiting portion while swinging the mirror around a swing axis, and a housing having an enclosed space partitioned by a plurality of wall portions including a first wall portion and a second wall portion, in which the light exiting portion and the scanning unit are placed in the enclosed space, wherein the first wall portion transmits the light reflected by the scanning unit, and the second wall portion includes a part of the light source unit.

DESCRIPTION OF EXEMPLARY EMBODIMENTS

A. First Embodiment

Figure 1:
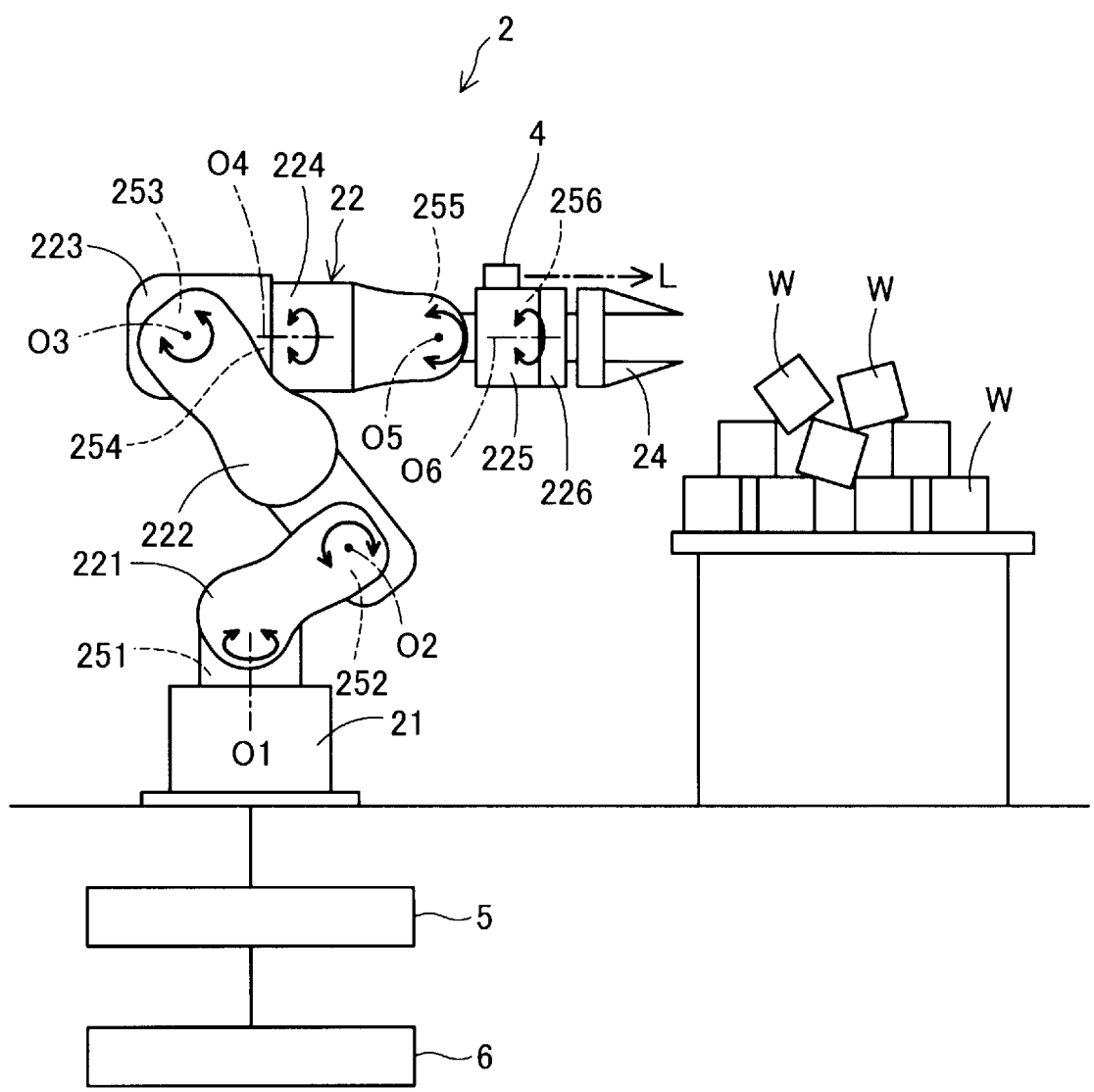
FIG. 1 shows a schematic configuration of a robot in a first embodiment.

FIG. 1 shows the schematic configuration of a robot 2 in the first embodiment of the present disclosure. The robot 2 includes a base 21, an arm 22, and an optical measuring apparatus 4. The optical measuring apparatus 4 is an apparatus for three-dimensional measurement of objects W using a laser beam L. To the robot 2, a robot control apparatus 5 that controls driving of the robot 2 based on the measurement result of the optical measuring apparatus 4 and a host computer 6 that can communicate with the robot control apparatus 5 are coupled. The robot 2, the robot control apparatus 5, the host computer 6, and the optical measuring apparatus 4 can communicate via wired connection or wireless connection. The communication may be made via a network including the Internet.

The robot 2 is a robot that performs work of e.g. feed, removal, transport, assembly, etc. of components. Note that the usage of the robot 2 is not limited to those. The robot 2 in the embodiment is a six-axis robot and has the base 21 fixed to a floor or ceiling and the arm 22 coupled to the base 21 as shown in FIG. 1.

The arm 22 includes a first arm unit 221, a second arm unit 222, a third arm unit 223, a fourth arm unit 224, a fifth arm unit 225, and a sixth arm unit 226. The first arm unit 221 is coupled pivotably about a first axis O1 relative to the base 21. The second arm unit 222 is coupled pivotably about a second axis O2 relative to the first arm unit 221. The third arm unit 223 is coupled pivotably about a third axis O3 relative to the second arm unit 222. The fourth arm unit 224 is coupled pivotably about a fourth axis O4 relative to the third arm unit 223. The fifth arm unit 225 is coupled pivotably about a fifth axis O5 relative to the fourth arm unit 224. The sixth arm unit 226 is coupled pivotably about a sixth axis O6 relative to the fifth arm unit 225. An end effector 24 according to the work to be executed by the robot 2 is attached to the sixth arm unit 226. Hereinafter, with respect to the arm 22, the end effector 24 side is also referred to as "distal end" or "distal end side" and the base 21 side is also referred to as "proximal end" or "proximal end side".

The robot 2 includes a first drive unit 251, a second drive unit 252, a third drive unit 253, a fourth drive unit 254, a fifth drive unit 255, and a sixth drive unit 256. The first drive unit 251 pivots the first arm unit 221 relative to the base 21. The second drive unit 252 pivots the second arm unit 222 relative to the first arm unit 221. The third drive unit 253 pivots the third arm unit 223 relative to the second arm unit 222. The fourth drive unit 254 pivots the fourth arm unit 224 relative to the third arm unit 223. The fifth drive unit 255 pivots the fifth arm unit 225 relative to the fourth arm unit 224. The sixth drive unit 256 pivots the sixth arm unit 226 relative to the fifth arm unit 225. The first drive unit 251 to the sixth drive unit 256 respectively have e.g. motors as drive sources, controllers that control driving of the motors, and encoders that detect amounts of rotation of the motors. The first drive unit 251 to the sixth drive unit 256 are respectively independently controlled by the robot control apparatus 5.

The robot 2 is not limited to the configuration of the embodiment. For example, the number of arm units of the arm 22 may be one to five, seven, or more. Or, for example, the type of the robot 2 may be a scalar robot or dual-arm robot having two arms 22.

The robot control apparatus 5 receives a command from the host computer 6 and respectively independently controls driving of the first drive unit 251 to the sixth drive unit 256 so that the first arm unit 221 to the sixth arm unit 226 may be located in positions according to the command. The robot control apparatus 5 includes e.g. a computer having one or more processors that process information, a memory coupled to the processor, and an external interface. In the memory, various programs that can be executed by the processor are stored. The processor reads and executes the various programs etc. stored in the memory, and thereby, controls operation of the robot control apparatus 5 and the robot 2.

Figure 2:
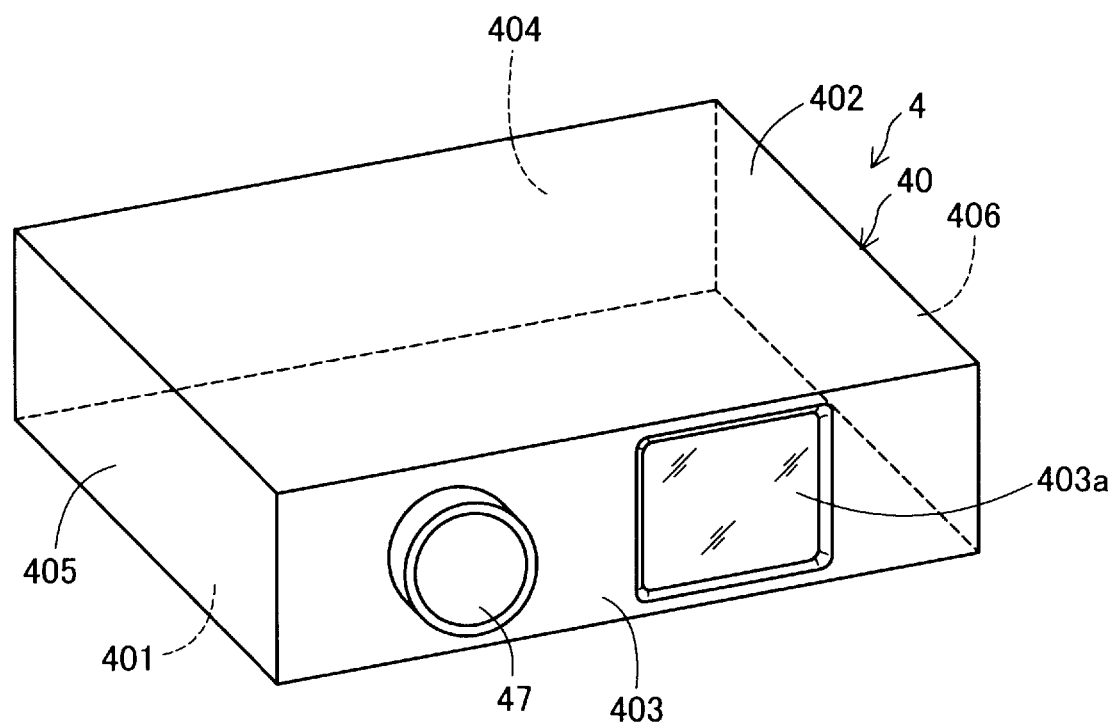
FIG. 2 is a perspective view of an optical measuring apparatus.

FIG. 2 is the perspective view of the optical measuring apparatus 4. The optical measuring apparatus 4 includes a case 40. In the embodiment, as shown in FIG. 1, the case 40 is fixed to the fifth arm unit 225 of the robot 2. Note that the position in which the case 40 is fixed is not limited to that in the fifth arm unit 225, but may be that in the first arm unit 221 to the fourth arm unit 224, the sixth arm unit 226, or the end effector 24.

The case 40 has a box shape surrounded by six wall surfaces. The six wall surfaces include a bottom surface 401 fixed to the fifth arm unit 225, a top surface 402 facing the bottom surface 401, a front surface 403 located at the distal end side of the fifth arm unit 225, a back surface 404 located at the proximal end side of the fifth arm unit 225, and a first side surface 405 and a second side surface 406 facing each other. Of these surfaces, in the front surface 403, a window portion 403a from which the laser beam L exits is provided. Further, a part of an imaging unit 47 may be exposed from the front surface 403. Note that the shape of the case 40 may be arbitrary, not particularly limited.

It is preferable to use a material having higher thermal conductivity such as aluminum or stainless steel for the constituent material of the case 40. The constituent material of the case 40 is not limited to those, but e.g. a resin or ceramics can be used. Further, the case 40 may be fixed directly to the fifth arm unit 225 of the robot 2 by the bottom surface 401 or fixed to the fifth arm unit 225 via a coupling member for fixation.

Figure 3:
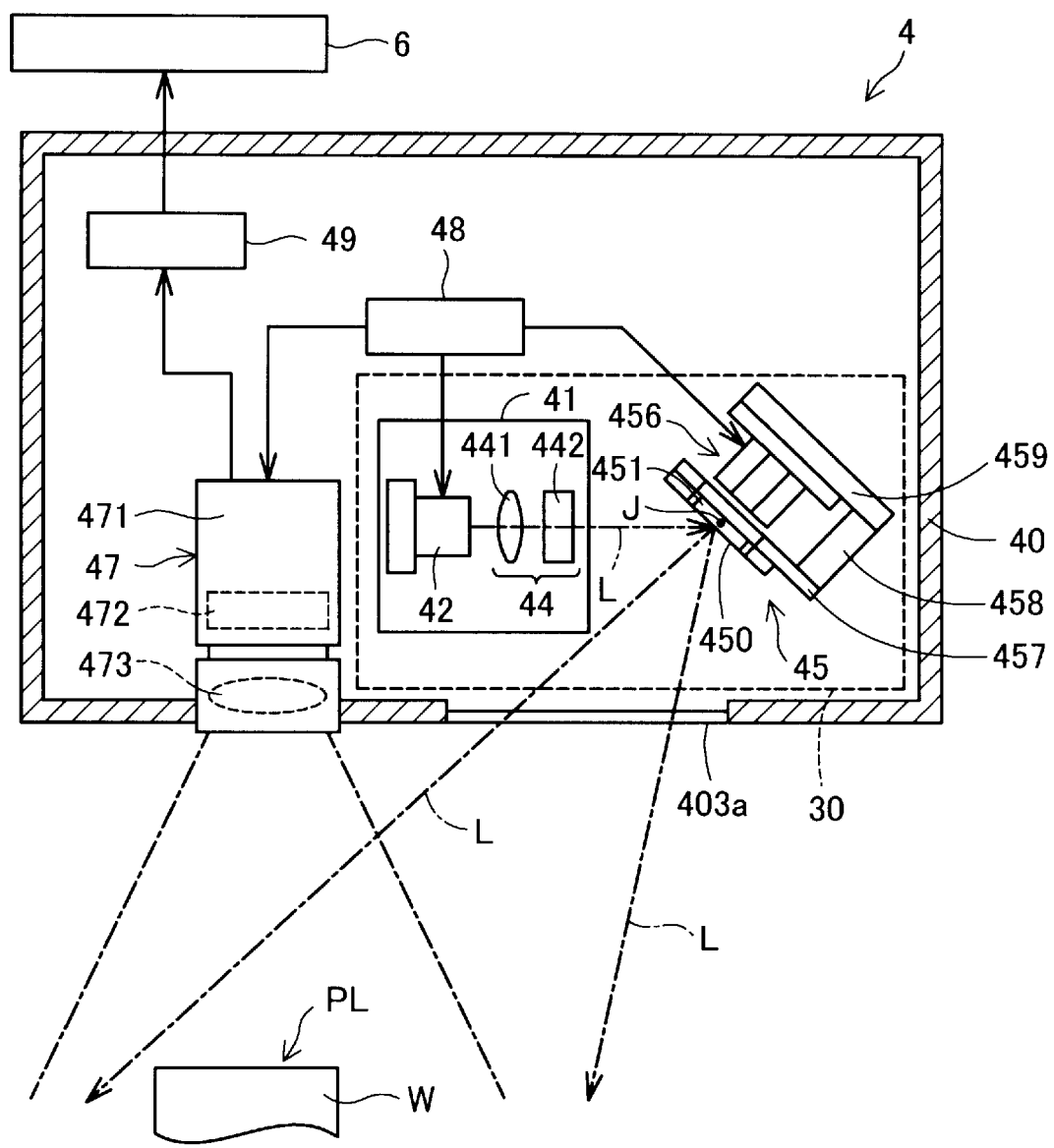
FIG. 3 schematically shows an internal configuration of the optical measuring apparatus.

FIG. 3 schematically shows the internal configuration of the optical measuring apparatus 4. The optical measuring apparatus 4 in the embodiment is the apparatus for three-dimensional measurement of the object W using a phase shift method. The optical measuring apparatus 4 includes an optical scanning device 30, the imaging unit 47, a control unit 48, and a measuring unit 49.

The optical scanning device 30 is a device that projects a pattern light PL for three-dimensional measurement by the laser beam L on a region containing the object W. The optical scanning device 30 includes a light source unit 41 and a scanning unit 45.

The light source unit 41 has a light emitting device 42 that outputs the laser beam L, and an optical system 44 including a plurality of lenses through which the laser beam L passes. As the light emitting device 42, e.g. a semiconductor laser such as a vertical cavity surface emitting laser (VCSEL) or vertical external cavity surface emitting laser (VECSEL) may be used. The optical system 44 has a first collecting lens 441 and a linearizing lens 442. The first collecting lens 441 is a lens for collecting the laser beam L output from the light emitting device 42. The linearizing lens 442 is a lens that linearizes the laser beam L collected by the first collecting lens 441 to be extended in a direction parallel to a swing axis J, which will be described later, i.e., a depth direction of FIG. 3, specifically, a rod lens, Powell lens, cylindrical lens, or the like. The laser beam L passing through the optical system 44 is output toward the scanning unit 45.

The scanning unit 45 has a function of scanning with the laser beam L linearized by the linearizing lens 442. As the scanning unit 45, e.g. an MEMS (Micro Electro Mechanical Systems), galvano mirror, polygon mirror, or the like may be used. The detailed configuration of the scanning unit 45 will be described later. The laser beam L used for scanning by the scanning unit 45 is output from the window portion 403a.

The imaging unit 47 images the region containing the object W on which the pattern light PL is projected and generates image data. The imaging unit 47 is placed to face the distal end side from the fifth arm unit 225. The imaging unit 47 images at least one object W with the pattern light PL projected thereon in the region containing the radiation range of the laser beam L. The imaging unit 47 includes e.g. a camera 471 having an imaging device 472 such as a CMOS image sensor or CCD image sensor and a second collecting lens 473. The imaging unit 47 transmits the generated image data to the measuring unit 49.

The control unit 48 controls driving of the scanning unit 45 and controls driving of the light emitting device 42 by applying a drive signal to the light emitting device 42. Further, the control unit 48 controls driving of the camera 471 to image the region containing the object W at a predetermined time.

The measuring unit 49 performs a three-dimensional measurement of the object W based on a plurality of pieces of image data acquired from the imaging unit 47. Specifically, the unit calculates three-dimensional information containing the posture, spatial coordinates, etc. of the object W. Then, the measuring unit 49 transmits the calculated three-dimensional information of the object W to the host computer 6.

The control unit 48 and the measuring unit 49 include e.g. computers each having one or more processors that process information, a memory coupled to the processor, and an external interface. In the memory, various programs that can be executed by the processor may be stored. The processor reads and executes the various programs etc. stored in the memory, and thereby, controls operation of the optical measuring apparatus 4. Note that the function of the measuring unit 49 may be incorporated into the control unit 48. The control unit 48 and the measuring unit 49 may be placed outside of the case 40 and included in e.g. the robot control apparatus 5 or the host computer 6.

Figure 4:
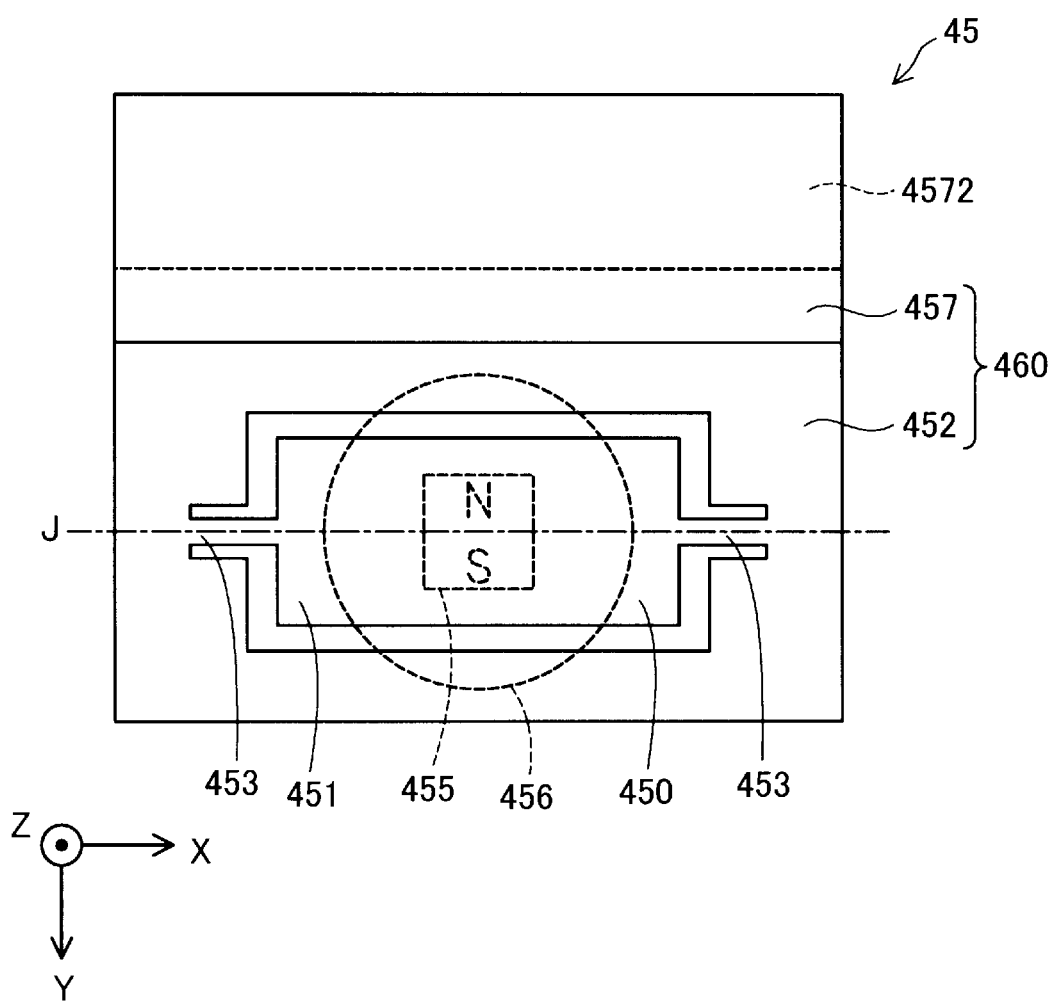
FIG. 4 is a plan view of a scanning unit.
Figure 5:
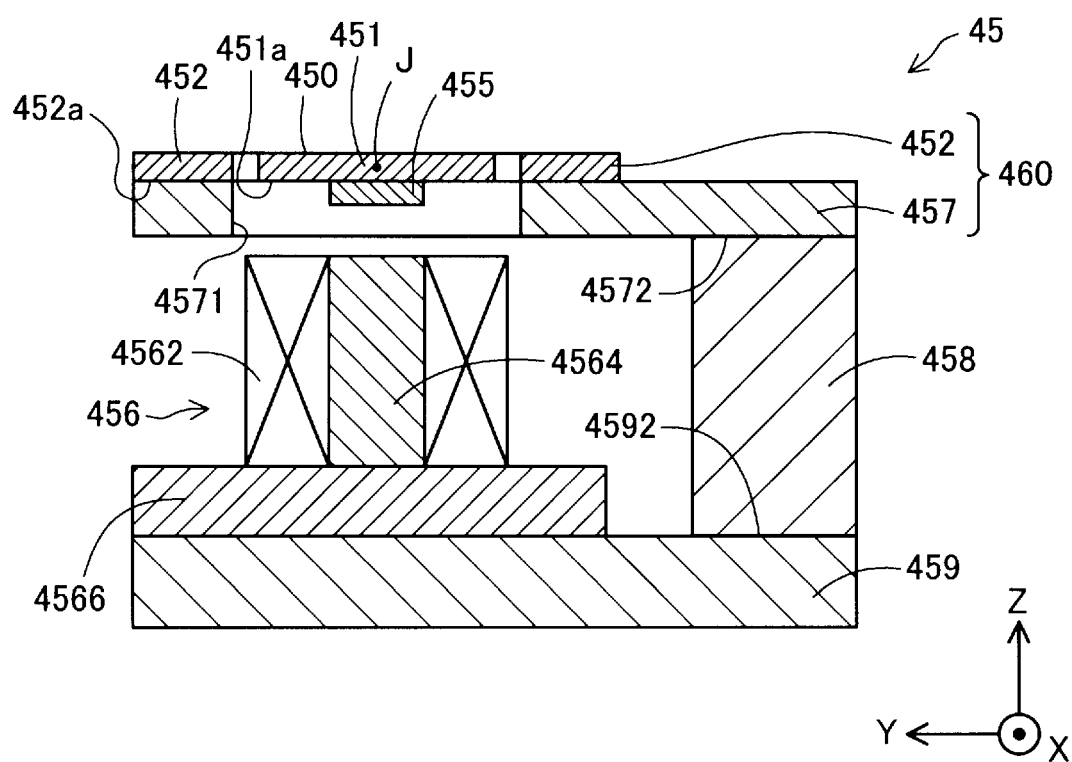
FIG. 5 is a sectional view of the scanning unit.
Figure 6:
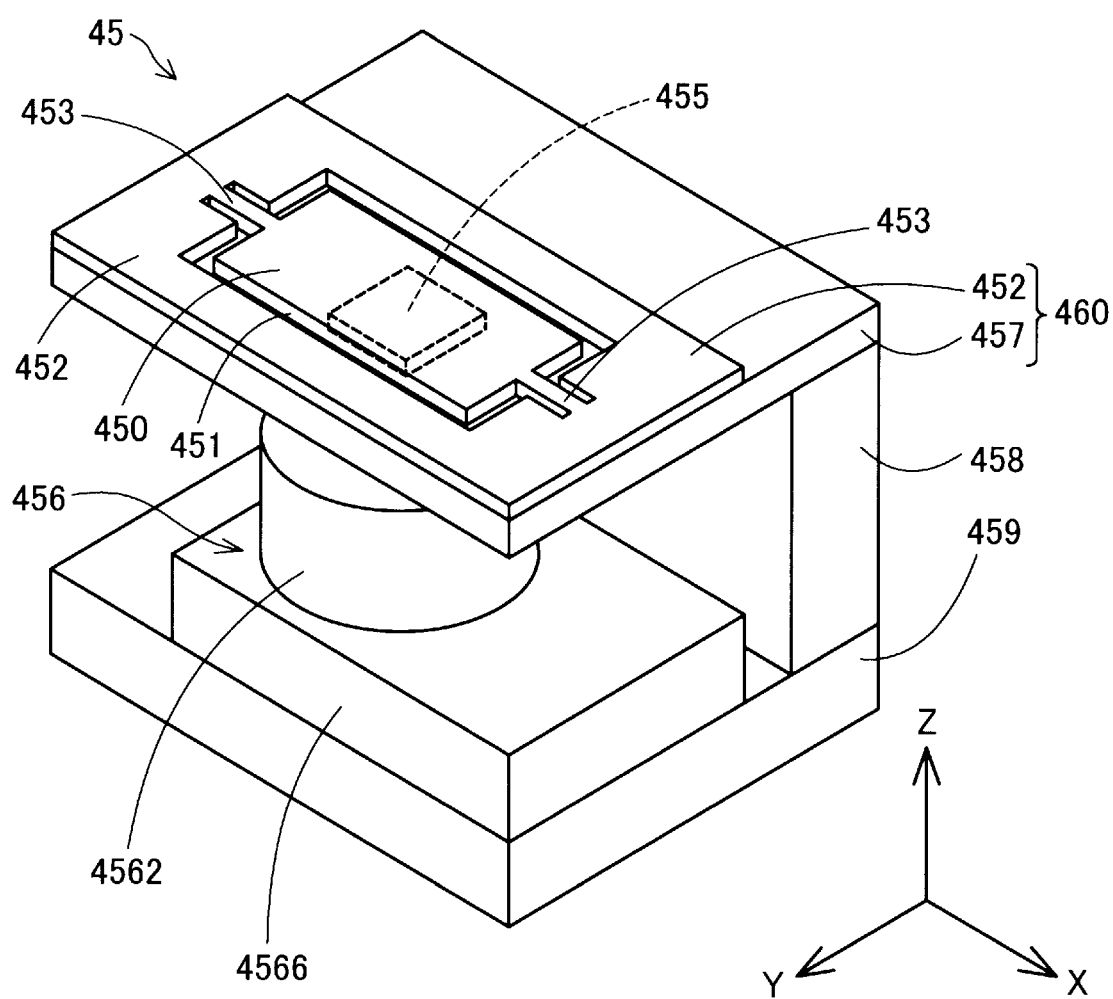
FIG. 6 is a perspective view of the scanning unit.

FIG. 4 is the plan view of the scanning unit 45. FIG. 5 is the sectional view of the scanning unit 45. FIG. 6 is the perspective view of the scanning unit 45. As shown in these drawings, the scanning unit 45 has a mirror 451 having a reflection surface 450, a permanent magnet 455 placed on the back surface of the mirror 451, a supporting plate 452 that supports the mirror 451, and axle portions 453 coupling the mirror 451 and the supporting plate 452. Further, the scanning unit 45 has a first member 457 on which the supporting plate 452 is placed, a second member 458 coupled to the first member 457, a third member 459 coupled to the second member 458, and an electromagnetic coil 456 placed to face the permanent magnet 455.

In FIGS. 4 to 6, of directions in which the normal of the reflection surface 450 in the stationary condition extends, the near side in the drawing is referred to as "+Z-axis direction" and the far side in the drawing is referred to as "−Z-axis direction". Further, the directions in which the axle portions 453 extend are referred to as "X-axis directions" orthogonal to the Z-axis directions. Furthermore, directions orthogonal to both the Z-axis directions and the X-axis directions are referred to as "Y-axis directions".

The mirror 451, the axle portions 453, and the supporting plate 452 are formed using the MEMS. As the constituent materials thereof, silicon-containing materials e.g. silicon, silicon oxide, and silicon nitride are used. Specifically, for example, patterning processing is performed on an SOI (Silicon on Insulator) substrate, and thereby, the supporting plate 452, the axle portions 453, 453 coupled thereto, and the mirror 451 may be formed.

The mirror 451 has the reflection surface 450 that reflects light and a first back surface 451a located at the opposite side to the reflection surface 450. The reflection surface 450 reflects the laser beam L. Note that a reflection film (not shown) is formed on the reflection surface 450. As the reflection film, e.g. a metal film of aluminum or the like is used.

The permanent magnet 455 is bonded to the first back surface 451a, and the permanent magnet 455 swings with the mirror 451. The permanent magnet 455 is magnetized in the Y-axis directions orthogonal to the swing axis J. As the permanent magnet 455, e.g. a neodymium magnet, ferrite magnet, samarium-cobalt magnet, alnico magnet, bond magnet, or the like is used.

The axle portions 453 couple the mirror 451 and the supporting plate 452 and supports the mirror 451 swingably about the swing axis J. The axle portions 453 are placed with the mirror 451 in between to support the mirror 451 from both sides in the X-axis directions. The axle portions 453 are torsionally deformed with the swing of the mirror 451 about the swing axis J.

The supporting plate 452 has a frame shape in a plan view from the Z-axis directions and is placed to surround the mirror 451. The supporting plate 452 swingably supports the mirror 451 via the two axle portions 453, 453.

The supporting plate 452 has a second back surface 452a. The first member 457 is placed on the second back surface 452a. The first member 457 has a function as a reinforcing portion that reinforces the mechanical strength of the supporting plate 452. The first member 457 has a plate-like shape spreading along the XY plane. The first member 457 has a frame shape in the plan view from the Z-axis directions like the supporting plate 452 and, as shown in FIG. 5, has an opening portion 4571 through which a region corresponding to the mirror 451 penetrate. By the opening portion 4571, a space in which the permanent magnet 455 is placed and a space in which the mirror 451 swings are secured. Hereinafter, the supporting plate 452 and the first member 457 are referred to as a supporting part 460 that supports the mirror 451. The supporting part 460 has a function of supporting the mirror 451 in the scanning unit 45 and forms a surface facing the +Z-axis direction.

The first member 457 extends beyond the supporting plate 452 in the −Y-axis direction. The end portion in the Y-axis direction is coupled to the second member 458. Specifically, of the surface in the −Z-axis direction of the first member 457, the end portion in the −Y-axis direction is a first supporting surface 4572 supported by the second member 458. Note that the supporting plate 452 may extend to the end portion in the −Y-axis direction of the first member 457.

The end surface in the +Z-axis direction of the second member 458 is coupled to the first member 457 and the end surface in the −Z-axis direction is coupled to the third member 459. In the embodiment, the supporting part 460 including the first member 457 is supported by the second member 458 only in the end portion in the −Y-axis direction thereof. That is, in the embodiment, the second member 458 cantilevers the supporting part 460. The second member 458 intervenes between the first member 457 and the third member 459. Thereby, a space having a height equal to the height of the second member 458 is formed between the first member 457 and the third member 459.

The third member 459 has a plate-like shape spreading along the XY plane. The end portion in the −Y-axis direction of the third member 459 is coupled to the second member 458. Specifically, of the surface in the +Z-axis direction of the third member 459, the end portion in the −Y-axis direction is a second supporting surface 4592 supporting the second member 458.

As the constituent materials of the first member 457 and the second member 458, for example, in addition to glass materials such as borosilicate glass and quartz glass, silicon, ceramics, metal, or the like may be used. It is preferable that the first member 457 and the second member 458 are formed using glass materials of these materials. The glass materials suppress temperature rises of the first member 457 and the second member 458 because of the lower thermal conductivity. Accordingly, deformation of the first member 457 may be effectively suppressed. Or, the borosilicate glass is preferably used, for example, when the constituent material of the supporting plate 452 is a silicon-containing material because of the linear coefficient of expansion closer to silicon.

As the constituent material of the third member 459, a metal material such as aluminum, aluminum alloy, stainless steel, copper, copper alloy, nickel and nickel alloy may be used. These metals may efficiently transfer the heat generated in the electromagnetic coil 456 because of the higher thermal conductivity.

The electromagnetic coil 456 is placed between the first member 457 and the third member 459. The electromagnetic coil 456 generates Lorentz force by conduction of an alternating current by the control unit 48 in the static magnetic field by the permanent magnet 455, and swings the mirror 451 with the permanent magnet 455 placed thereon.

The electromagnetic coil 456 shown in FIG. 5 includes a winding wire 4562, a first magnetic core 4564 inserted through the inside of the winding wire 4562, and a second magnetic core 4566 supporting the first magnetic core 4564. The second magnetic core 4566 has a plate-like shape and is placed on the surface in the +Z-axis direction of the third member 459. The first magnetic core 4564 has a cylindrical shape and is coupled to the second magnetic core 4566.

An alternating current and a direct current are applied from the control unit 48 to the winding wire 4562 via a wire (not shown). The first magnetic core 4564 and the second magnetic core 4566 are respectively cores for magnetic path adjustment. The first magnetic core 4564 and the second magnetic core 4566 are provided, and thereby, the magnetic paths may be adjusted and torque for swinging the mirror 451 may be increased. Accordingly, power consumption of the electromagnetic coil 456 may be reduced.

Further, the second magnetic core 4566 is coupled to the third member 459, and thereby, heat generated in the winding wire 4562 may be easily transferred to the third member 459 side. As a result, the temperature rise of the electromagnetic coil 456 may be further relaxed.

The constituent material of the first magnetic core 4564 and the constituent material of the second magnetic core 4566 respectively include e.g. various soft ferrite materials such as Mn—Zn-containing ferrite and Ni—Zn-containing ferrite.

In the scanning unit 45, the swing axis J coincides with the extension direction of the linear laser beam L, i.e., the widening direction of the laser beam L expanded by the linearizing lens 442. When a drive signal is applied from the control unit 48 to the electromagnetic coil 456, the mirror 451 swings about the swing axis J alternately forward and backward with a predetermined period, and thereby, planar scan with the linear laser beam L is performed. The control unit 48 outputs the laser beam L from the light emitting device 42 in synchronization with the swing of the mirror 451, and projects the pattern light PL in a vertically striped pattern represented by light and dark of brightness values on the object W. Note that the pattern represented by the pattern light PL is not particularly limited as long as the pattern may be used for the phase shift method.

In the phase shift method in the embodiment, the control unit 48 controls the light source unit 41 and the scanning unit 45 to project the pattern light PL on the object W with phase shift of $\pi/2$ at four times and images the object W with the pattern light PL projected thereon using the imaging unit 47 at each time. The number of times of projection of the pattern light PL is not particularly limited as long as the phase may be calculated from the imaging results. Or, the same projection and imaging are performed using a pattern with a larger pitch or a pattern with a smaller pitch and phase unwrapping may be performed. The measurement range and resolution may be increased as the types of pitch are increased, however, the time taken for acquiring the image data is increased as the number of times of imaging increases and the operation efficiency of the robot 2 is lower. Accordingly, the number of times of projection of the pattern light PL may be appropriately set with balance between the accuracy and measurement range of the three-dimensional measurement and the operation efficiency of the robot 2.

The host computer 6 generates a position command of the robot 2 from the three-dimensional information of the object W calculated by the measuring unit 49 based on the imaging result by the imaging unit 47, and transmits the generated position command to the robot control apparatus 5. The robot control apparatus 5 respectively independently drives the first drive unit 251 to the sixth drive unit 256 based on the position command received from the host computer 6 and moves the first arm unit 221 to the sixth arm unit 226 to the positions as instructed.

Figure 7:
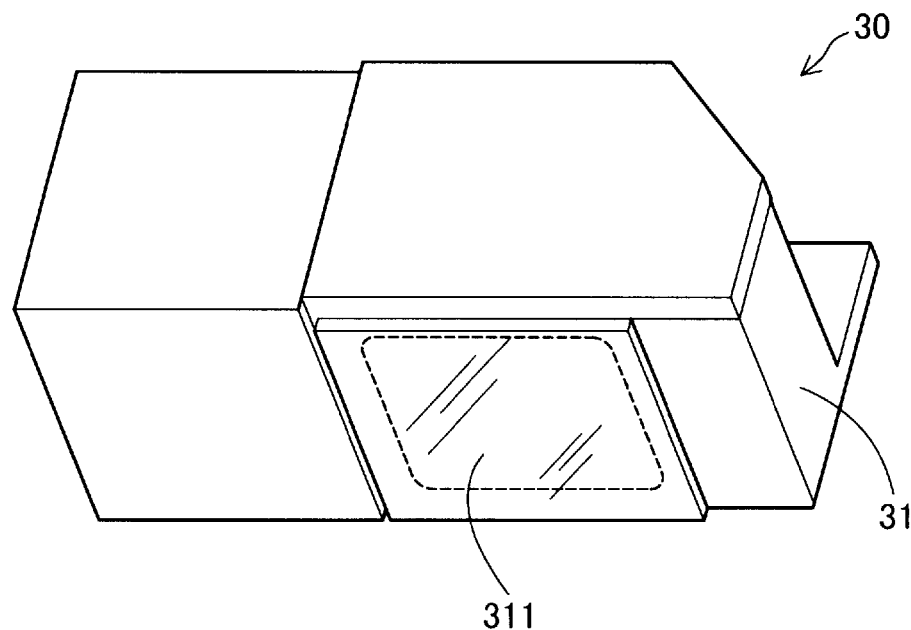
FIG. 7 is a perspective view showing an appearance of an optical scanning device.
Figure 8:
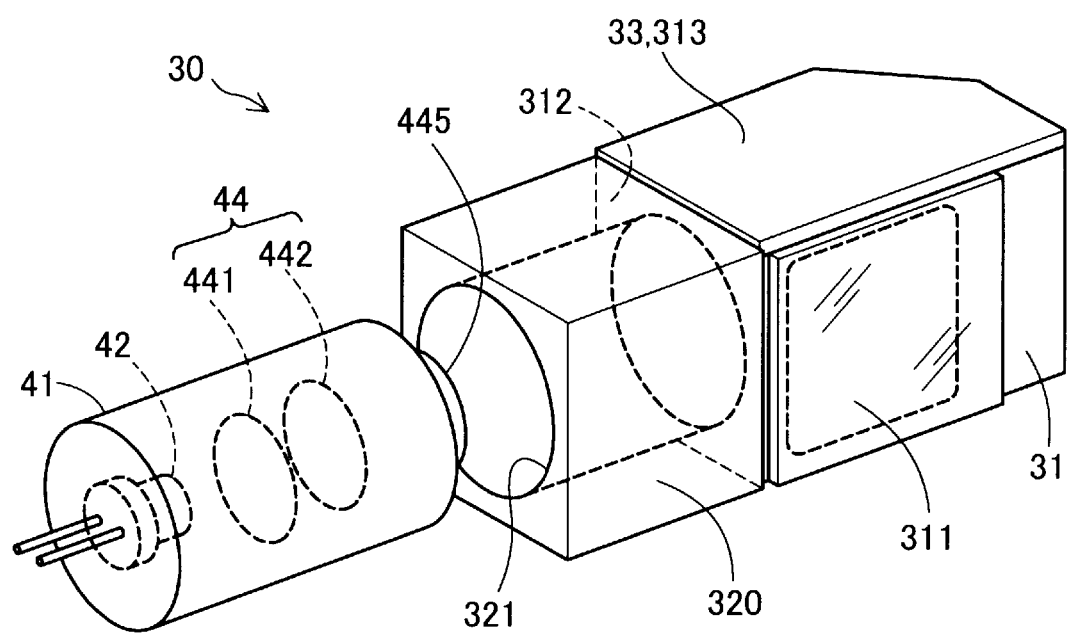
FIG. 8 shows a state in which a light source unit is detached from the optical scanning device.
Figure 9:
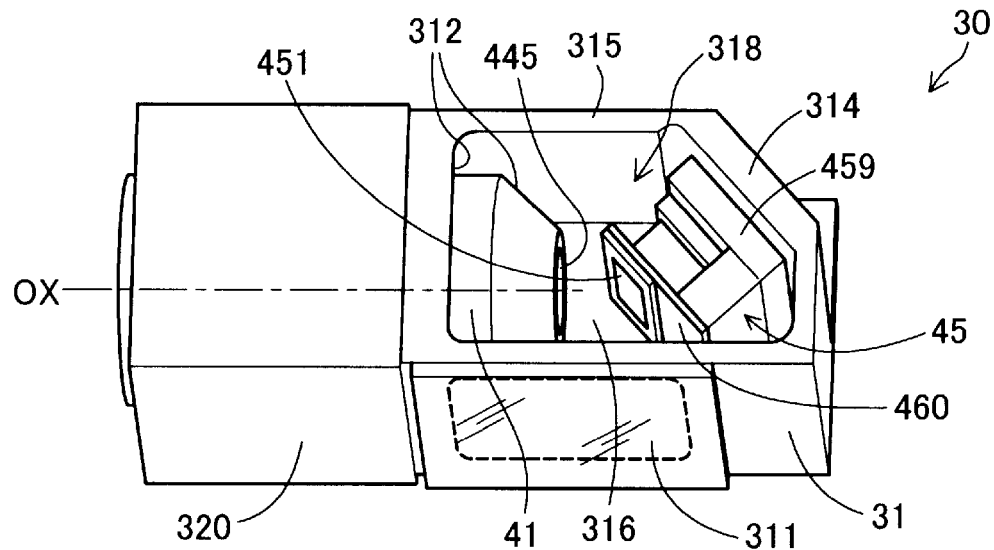
FIG. 9 is a perspective view showing a component arrangement within the optical scanning device.
Figure 10:
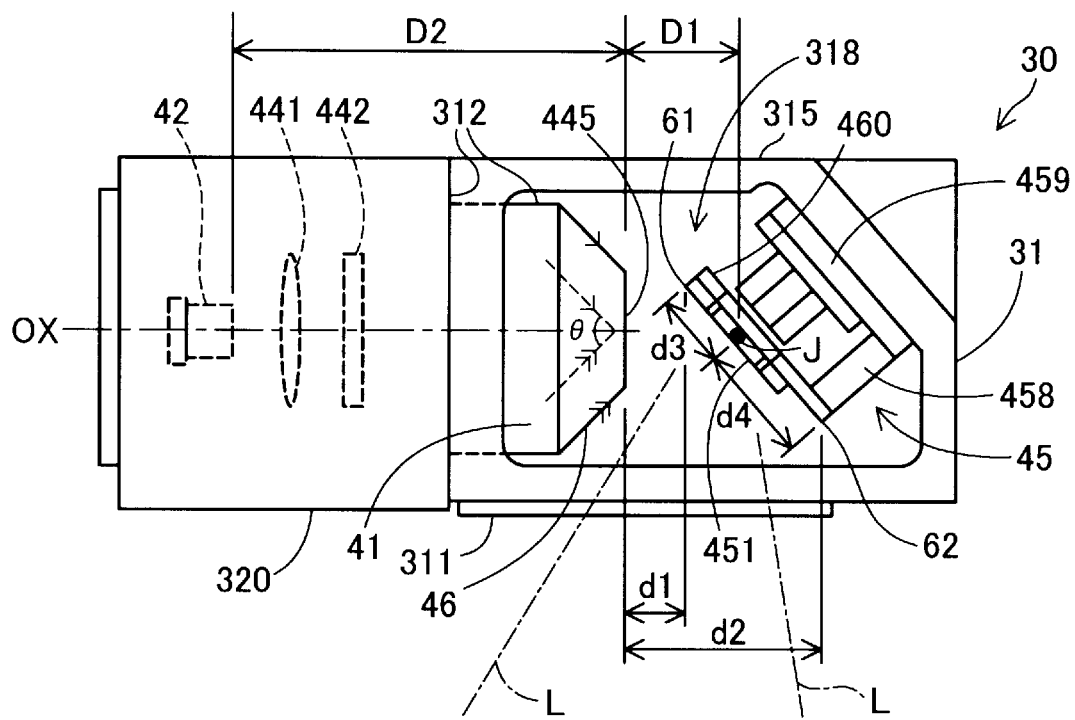
FIG. 10 is a plan view showing the component arrangement within the optical scanning device.

As below, the specific configuration of the optical scanning device 30 will be explained using FIGS. 7 to 10. FIG. 7 is the perspective view showing the appearance of the optical scanning device 30. FIG. 8 shows the state in which the light source unit 41 is detached from the optical scanning device 30. FIG. 9 is the perspective view showing the component arrangement within the optical scanning device 30. FIG. 10 is the plan view showing the component arrangement within the optical scanning device 30. As shown in these drawings, the optical scanning device 30 includes a housing 31, the light source unit 41, and the scanning unit 45.

As shown in FIG. 7, the housing 31 of the optical scanning device 30 has a substantially rectangular parallelepiped shape and, in the embodiment, has a form formed by cutting off of a partial angle portion of the rectangular parallelepiped. The housing 31 includes a first wall portion 311. The first wall portion 311 is configured to transmit the light reflected by the mirror 451 of the scanning unit 45 provided inside. In the embodiment, an opening portion is provided in the first wall portion 311 and a glass plate is bonded to the opening portion, and thereby, the first wall portion 311 is formed. The first wall portion 311 faces the window portion 403a provided in the optical measuring apparatus 4 when the optical scanning device 30 is placed within the case 40 of the optical measuring apparatus 4. Note that, in the other embodiments, the first wall portion 311 of the housing 31 may be omitted and the case 40 and the window portion 403a of the optical measuring apparatus 4 may be placed in the part of the portion in close contact. Or, the window portion 403a of the optical measuring apparatus 4 may be omitted and the first wall portion 311 of the optical scanning device 30 may function as the window portion of the optical measuring apparatus 4.

As shown in FIG. 8, the housing 31 includes a holding part 320 that holds the light source unit 41. In the embodiment, the light source unit 41 has a substantially cylindrical appearance shape and includes the light emitting device 42 and the optical system 44 including the first collecting lens 441 and the linearizing lens 442 inside. A light exiting portion 445 from which the light is output is provided in the end portion of the light source unit 41. In the holding part 320, a through hole 321 for housing the light source unit 41 is formed. The light source unit 41 is press-fitted into the through hole 321, and thereby, the holding part 320 holds the light source unit 41. In the holding part 320, a positioning structure for positioning the light source unit 41 with respect to the housing 31 may be provided. The positioning structure includes e.g. a screw hole passing through the outer wall of the holding part 320 and penetrating the surface of the light source unit 41 and a screw screwed into the screw hole. Note that, in the embodiment, the light source unit 41 has the substantially cylindrical appearance shape, however, may have a substantially quadrangular prism shape or substantially triangular prism shape. The shapes of the light source unit 41 and the holding part 320 may be any shapes as long as the light source unit 41 may be fixed to the case 40.

The housing 31 includes a lid part 33 in the upper surface. When the lid part 33 is detached, as shown in FIGS. 9 and 10, the internal structure of the optical scanning device 30 is exposed.

As shown in FIG. 9, the housing 31 has an enclosed space 318 partitioned by a plurality of walls including the first wall portion 311 and a second wall portion 312. The enclosed space 318 is not necessarily completely air-tightly sealed as long as the enclosed space has air-tightness to such a degree that may prevent entry of dust from outside. In the enclosed space 318, the light exiting portion 445 provided in the light source unit 41 and the scanning unit 45 are placed. As described above, the scanning unit 45 has the mirror 451 supported by the supporting part 460 and reflects the light output from the light exiting portion 445 toward the outside while swinging the mirror 451 around the swing axis J.

In the embodiment, the second wall portion 312 includes a part of the light source unit 41. In the embodiment, the part of the light source unit 41 projects into the enclosed space 318 and the projecting portion forms a part of the second wall portion 312 that partitions the enclosed space 318. Further, in the embodiment, a part of the holding part 320 is in contact with the enclosed space 318. That is, the part of the holding part 320 forms a part of the second wall portion 312 that partitions the enclosed space 318 with the light source unit 41.

The plurality of wall portions partitioning the enclosed space 318 include a fourth wall portion 314 to which the scanning unit 45 is fixed, a third wall portion 313 formed by the lid part 33, a fifth wall portion 315 facing the first wall portion 311, and a sixth wall portion 316 facing the third wall portion 313 in addition to the first wall portion 311 and the second wall portion 312. In the embodiment, the scanning unit 45 is placed with inclination relative to an optical axis OX of the light source unit 41 to reflect the light output from the light exiting portion 445 toward the first wall portion 311. The fourth wall portion 314 with the scanning unit 45 fixed thereto is inclined relative to the first wall portion 311 and the fifth wall portion 315 so that the scanning unit 45 may be placed with inclination relative to the optical axis OX of the light source unit 41. The third member 459 of the scanning unit 45 is screwed or bonded to the fourth wall portion 314.

As described above, in the embodiment, the scanning unit 45 is inclined relative to the optical axis OX of the light source unit 41. Accordingly, as shown in FIG. 10, the supporting part 460 provided in the scanning unit 45 has one end portion 61 at a shorter distance d1 from the light source unit 41 and another end portion 62 at a longer distance d2 from the light source unit 41 than the one end portion 61. In the embodiment, a distance d3 from the swing axis J of the mirror 451 to the one end portion 61 is shorter than a distance d4 from the swing axis J to the other end portion 62. The distance d3 from the swing axis J to the one end portion 61 and the distance d4 from the swing axis J to the other end portion 62 are different because the supporting part 460 provided with the mirror 451 is cantilevered by the second member 458 as shown in FIG. 6. Accordingly, in the embodiment, the second member 458 is placed in the position closer to the first wall portion 311 than the fifth wall portion 315.

In the embodiment, the light source unit 41 has a tapered portion 46 around the light exiting portion 445. That is, the light source unit 41 has the tapered portion 46 thinner toward the light exiting portion 445 within the enclosed space 318. The outer diameter in the part in which the light exiting portion 445 of the light source unit 41 is provided is smaller than the outer diameter of the other part of the light source unit 41. A taper angle θ of the tapered portion 46 is an angle at which the laser beam L reflected by the mirror 451 of the scanning unit 45 is not blocked by the light source unit 41.

In the embodiment, the light source unit 41 has the light emitting device 42 inside. The light emitting device 42 is provided in a position outside of the enclosed space 318 when the light source unit 41 is held by the holding part 320. Further, a second distance D2 between the light exiting portion 445 and the light emitting device 42 is longer than a first distance D1 between the light exiting portion 445 and the mirror 451 along the optical axis OX of the light source unit 41.

According to the above described optical scanning device 30 of the embodiment, the light exiting portion 445 of the light source unit 41 and the scanning unit 45 are placed in the enclosed space 318 within the housing 31. Accordingly, the size of the optical scanning device 30 may be made smaller than that when these are placed in different spaces. In addition, in the embodiment, the light exiting portion 445 and the scanning unit 45 are placed in the enclosed space 318, and thereby, the output of the laser beam L to the outside may be performed by single transmission through the first wall portion 311. In the viewpoint, for example, the light output may be made higher than that in a case where the light exiting portion 445 is placed outside of the first wall portion 311 and the laser beam L is transmitted through the first wall portion 311 at a plurality of times.

Further, in the embodiment, the supporting part 460 supporting the mirror 451 has the one end portion 61 at the shorter distance d1 from the light source unit 41 and the other end portion 62 at the longer distance d2 than the one end portion 61 from the light source unit 41, and the distance d3 from the swing axis J to the one end portion 61 is shorter than the distance d4 from the swing axis J to the other end portion 62. Accordingly, the scanning unit 45 may be efficiently placed in the enclosed space 318. Particularly, in the embodiment, according to the configuration, the second member 458 supporting the supporting part 460 is placed in the position closer to the first wall portion 311 than the fifth wall portion 315, and therefore, the size of the optical scanning device 30 in the depth direction, i.e., the size in the upward and downward directions in FIG. 10 may be made smaller than that in a case where the second member 458 is placed in a position closer to the fifth wall portion 315 than the first wall portion 311. Furthermore, according to the above described configuration, the one end portion 61 may be made closer to the light exiting portion 445 and the size of the optical scanning device 30 in the optical axis OX direction, i.e., the size in the leftward and rightward directions in FIG. 10 may be made smaller.

In the embodiment, the optical scanning device 30 includes the holding part 320 that holds the light source unit 41. Accordingly, the configuration of the entire device may be made smaller than that in a case where the light source unit 41 is placed outside. Further, in the embodiment, the light source unit 41 is formed in the substantially cylindrical shape and placed within the through hole 321 formed in the holding part 320, and thereby, the light source unit 41 and the holding part 320 are in surface contact and the light source unit 41 may be stably fixed to the holding part 320.

In the embodiment, the holding part 320 forms the part of the second wall portion 312. Accordingly, the part of the enclosed space 318 may be partitioned by the holding part 320 and the optical scanning device 30 may be downsized.

In the embodiment, the light source unit 41 has the tapered portion 46 thinner toward the light exiting portion 445. Accordingly, blocking by the light source unit 41 of the light reflected from the mirror 451 may be suppressed and the light source unit 41 may be placed closer to the scanning unit 45. Therefore, the optical scanning device 30 may be downsized.

In the embodiment, the light source unit 41 has the light emitting device 42 and the second distance D2 between the light exiting portion 445 and the light emitting device 42 is longer than the first distance D1 between the light exiting portion 445 and the mirror 451. As a result, the heat generated by the light emitting device 42 is harder to be transferred to the scanning unit 45 and the influence on the accuracy of scanning with the laser beam by the scanning unit 45 may be suppressed.

Further, in the embodiment, the optical scanning device 30 may be downsized as described above, and therefore, the optical measuring apparatus 4 and the robot 2 can be downsized.

B. Other Embodiments (B-1) In the above described embodiment, the distance d3 from the swing axis J of the mirror 451 to the one end portion 61 of the supporting part 460 is shorter than the distance d4 from the swing axis J to the other end portion 62 of the supporting part 460. However, to the contrary, the distance d3 from the swing axis J to the one end portion 61 may be longer than the distance d4 from the swing axis J to the other end portion 62 of the supporting part 460. Even in this case, in the above described embodiment, the tapered portion 46 is provided in the light source unit 41, and thereby, interference of the proximity of the one end portion 61 of the scanning unit 45 with the light source unit 41 may be suppressed.

(B-2) In the above described embodiment, the housing 31 of the optical scanning device 30 includes the holding part 320 holding the light source unit 41. However, the holding part 320 may be formed separately from the housing 31 of the optical scanning device 30. For example, the holding part 320 may be attached to the case 40 of the optical measuring apparatus 4. In this case, the holding part 320 does not form the part of the second wall portion 312, but another wall portion provided in the housing 31 forms the second wall portion 312.

(B-3) In the above described embodiment, the holding part 320 forms the part of the second wall portion 312 of the optical scanning device 30. On the other hand, the holding part 320 does not necessarily form the part of the second wall portion 312. That is, the holding part 320 does not necessarily partition the enclosed space 318.

(B-4) In the above described embodiment, the light source unit 41 includes the tapered portion 46. However, the light source unit 41 does not necessarily the tapered portion 46. For example, the end portion of the light source unit 41 at the light exiting portion 445 side may be made smaller in diameter than the portion placed within the holding part 320.

(B-5) In the above described embodiment, the second distance D2 between the light exiting portion 445 and the light emitting device 42 is longer than the first distance D1 between the light exiting portion 445 of the light source unit 41 and the mirror 451. On the other hand, these distances may have a reversed relationship and the first distance D1 between the light exiting portion 445 and the mirror 451 may be longer than the second distance D2 between the light exiting portion 445 and the light emitting device 42.

(B-6) In the above described embodiment, the optical scanning device 30 is provided in the optical measuring apparatus 4. However, the optical scanning device 30 may be provided in an image display apparatus such as a projector or head-up display, not in the optical measuring apparatus 4.

(B-7) In the above described embodiment, the optical measuring apparatus 4 is provided in the robot 2. However, the optical measuring apparatus 4 may be coupled, not to the robot 2, but to the computer and used as a three-dimensional measuring apparatus or mounted on a heavy machine, construction machine, automobile, or the like and used as an apparatus for controlling operation thereof.

(B-8) In the above described embodiment, the configuration of the optical scanning device 30 is not particularly limited as long as the predetermined pattern light PL may be projected on the object W. For example, in the above described embodiment, the laser beam L is linearly diffused by the optical system 44, however not limited thereto, for example, may be linearly diffused using an MEMS or galvano mirror. That is, two-dimensional scan may be performed with the laser beam L using two scanning units 45. Or, two-dimensional scan may be performed with the laser beam L using a gimbal MEMS having a degree of freedom of two axes.

(B-9) In the above described embodiment, the robot control apparatus 5, the measuring unit 49, and the control unit 48 are respectively formed using the computers. However, these can be realized using various kinds of hardware. As the hardware, e.g. integrated circuits, discrete circuits, or modules with combinations of those circuits can be used. The integrated circuits include various LSIs such as FPGAs (Field-Programmable Gate Arrays) and ASIC (Application Specific Integrated Circuits).

C. Other Aspects

The present disclosure is not limited to the above described embodiments, but may be realized in various configurations without departing from the scope thereof. For example, the technical features of the embodiments corresponding to the technical features in the following aspects can be appropriately replaced or combined for solving part or all of the above described problems or achieving part or all of the above described effects. Further, the technical features can be appropriately deleted unless the technical features are explained as essential features in this specification.

(1) According to a first aspect of the present disclosure, an optical scanning device is provided. The optical scanning device includes a light source unit having a light exiting portion from which a light is output, a scanning unit having a mirror supported by a supporting part and reflecting the light output from the light exiting portion while swinging the mirror around a swing axis, and a housing having an enclosed space partitioned by a plurality of wall portions including a first wall portion and a second wall portion, in which the light exiting portion and the scanning unit are placed in the enclosed space, wherein the first wall portion transmits the light reflected by the scanning unit, and the second wall portion includes a part of the light source unit.

In the optical scanning device according to the aspect, the light exiting portion of the light source unit and the scanning unit are placed in the enclosed space within the housing, and therefore, the device may be downsized.

(2) In the above described aspect, the supporting part may have one end portion and another end portion farther from the light source unit than the one end portion, and a distance from the swing axis to the one end portion may be shorter than a distance from the swing axis to the other end portion. According to the aspect, the scanning unit may be efficiently placed in the enclosed space.

(3) In the above described aspect, a holding part that holds the light source unit may be provided. According to the aspect, the light source unit is held by the optical scanning device, and thereby, the device may be downsized.

(4) In the above described aspect, a part of the holding part may form a part of the second wall portion. According to the aspect, the part of the enclosed space may be partitioned by the holding part, and thereby, the device may be downsized.

(5) In the above described aspect, the light source unit may have a tapered portion thinner toward the light exiting portion in the enclosed space. According to the aspect, blocking of the light reflected from the mirror by the light source unit may be suppressed, and thereby, the device may be downsized. Further, interference of the light source unit with the supporting part may be suppressed.

(6) In the above described aspect, the light source unit may have a light emitting device, and a second distance between the light exiting portion and the light emitting device may be longer than a first distance between the light exiting portion and the mirror. According to the aspect, an influence by the heat generated by the light emitting device on the accuracy of scan by the scanning unit may be suppressed.

(7) According to a second aspect of the present disclosure, an optical measuring apparatus is provided. The optical measuring apparatus includes the optical scanning device according to the above described aspect, an imaging unit that images an object irradiated with the light output from the light scanning device, and a measuring unit that performs a measurement of the object based on an imaging result by the imaging unit. According to the aspect, the optical measuring apparatus may be downsized.

(8) According to a third aspect of the present disclosure, a robot is provided. The robot includes the optical measuring apparatus in the second aspect, and an arm controlled using a measurement result by the optical measuring apparatus. According to the aspect, the robot may be downsized.

What is claimed is:

1. An optical scanning device comprising:
    a light source unit having a light exiting portion from which a light is output;
    a scanning unit having a mirror supported by a supporting part and reflecting the light output from the light exiting portion while swinging the mirror around a swing axis; and
    a housing having an enclosed space partitioned by a plurality of wall portions including a first wall portion and a second wall portion, in which the light exiting portion and the scanning unit are placed in the enclosed space, wherein
    the first wall portion transmits the light reflected by the scanning unit, and
    the second wall portion includes a part of the light source unit,
    wherein the scanning unit has a permanent magnet placed on the back surface of the mirror, and an electromagnetic coil placed to face the permanent magnet, and
    the scanning unit has a first member on which the supporting part is placed, a second member coupled to the first member, a third member coupled to the second member, and the electromagnetic coil is placed between the first member and the third member.

2. The optical scanning device according to claim 1, wherein
    the supporting part has one end portion and another end portion farther from the light source unit than the one end portion, and
    a distance from the swing axis to the one end portion is shorter than a distance from the swing axis to the other end portion.

3. The optical scanning device according to claim 1, further comprising a holding part that holds the light source unit.

4. The optical scanning device according to claim 3, wherein
    the holding part forms a part of the second wall portion.

5. The optical scanning device according to claim 1, wherein
    the light source unit has a tapered portion thinner toward the light exiting portion in the enclosed space.

6. The optical scanning device according to claim 1, wherein
    the light source unit has a light emitting device, and
    a second distance between the light exiting portion and the light emitting device is longer than a first distance between the light exiting portion and the mirror.

7. An optical measuring apparatus comprising:
    the optical scanning device according to claim 1;
    an imaging unit that images an object irradiated with the light output from the light scanning device; and
    a measuring unit that performs a measurement of the object based on an imaging result by the imaging unit.

8. A robot comprising:
    an optical measuring apparatus according to claim 7; and
    an arm controlled using a measurement result by the optical measuring apparatus.

* * * * *